(12) United States Patent
Hong et al.

(10) Patent No.: US 8,953,534 B2
(45) Date of Patent: Feb. 10, 2015

(54) APPARATUS AND METHOD FOR AVOIDING DOWNLINK INTERFERENCE FROM INTERFERING BASE STATION IN MOBILE COMMUNICATION SYSTEM

(75) Inventors: Ki-Seob Hong, Suwon-si (KR); Sung-Han Lee, Seoul (KR); Il-Jin Youn, Bucheon-si (KR); Jae-Hee Cho, Seoul (KR); Byung-Chan Ahn, Seoul (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 330 days.

(21) Appl. No.: 13/363,238

(22) Filed: Jan. 31, 2012

(65) Prior Publication Data

US 2012/0195272 A1     Aug. 2, 2012

(30) Foreign Application Priority Data

Jan. 31, 2011    (KR) ................ 10-2011-0009292

(51) Int. Cl.
*H04W 4/00*       (2009.01)
*H04W 72/08*      (2009.01)
*H04W 92/12*      (2009.01)

(52) U.S. Cl.
CPC .......... *H04W 72/082* (2013.01); *H04W 92/12* (2013.01)

USPC ...................... 370/329; 370/328; 370/338

(58) Field of Classification Search
CPC ...... H04W 72/04; H04W 88/08; H04W 76/00
USPC .................... 370/322, 328, 329, 338
See application file for complete search history.

(56) References Cited

U.S. PATENT DOCUMENTS

| | | | |
|---|---|---|---|
| 8,423,035 B1* | 4/2013 | Dinan et al. ................. 455/450 |
| 2008/0107047 A1* | 5/2008 | Olfat ............................. 370/280 |
| 2009/0092090 A1* | 4/2009 | Beems Hart et al. ......... 370/329 |
| 2009/0247086 A1* | 10/2009 | Lin et al. .................... 455/67.11 |
| 2009/0285143 A1* | 11/2009 | Kwun et al. .................. 370/311 |
| 2010/0009634 A1* | 1/2010 | Budianu et al. ............. 455/63.1 |
| 2010/0210214 A1* | 8/2010 | Pawar et al. ................ 455/63.1 |
| 2011/0171949 A1* | 7/2011 | Liao et al. .................. 455/422.1 |

* cited by examiner

*Primary Examiner* — Michael J Moore, Jr.
*Assistant Examiner* — Siren Wei

(57) ABSTRACT

A method for avoiding interference of an interfering Base Station (BS) in an interfered BS of a mobile communication system includes determining an interference value of an interfering BS at a control region during a determination interval. When the interference value is greater than a threshold value, the method further includes operating in a modified Transmit/receive Transition Gap (TTG) mode. When the interference value is less than the threshold value, the method further includes operating in a general TTG mode.

26 Claims, 9 Drawing Sheets

CHANGE OF NUMBER OF SYMBOLS (29:18 → 32:15)
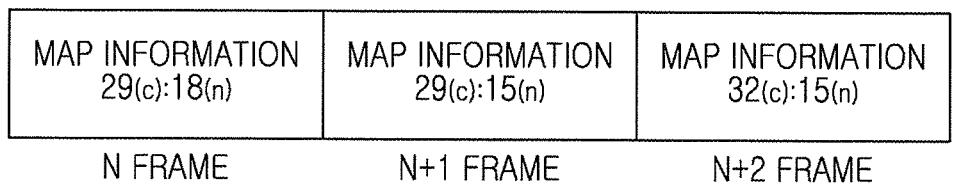
CHANGE OF NUMBER OF SYMBOLS (32:15 → 29:18)
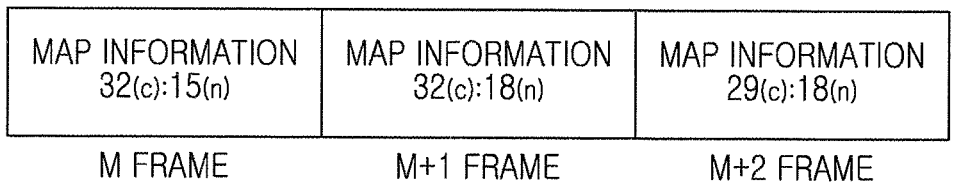
FIG.9

APPARATUS AND METHOD FOR AVOIDING DOWNLINK INTERFERENCE FROM INTERFERING BASE STATION IN MOBILE COMMUNICATION SYSTEM

CROSS REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 31, 2011, and assigned Serial No. 10-2011-0009292, the entire disclosure of which is hereby incorporated by reference.

TECHNICAL FIELD OF THE INVENTION

The present invention relates to a mobile communication system and, more particularly, to an apparatus and method for avoiding downlink interference from an interfering base station in a mobile communication system.

BACKGROUND OF THE INVENTION

In a Time Division Duplex (TDD) mobile communication system, with the deployment of base stations (BSs), even interference between a downlink sub-frame of one BS and an uplink sub-frame of another BS is a problem to solve.

Accordingly, a method and apparatus for avoiding interference between BSs are needed.

SUMMARY OF THE INVENTION

To address the above-discussed deficiencies, one aspect of the present disclosure is to provide a method and apparatus for avoiding downlink interference of an interfering Base Station (BS) in a mobile communication system.

Another aspect of the present disclosure is to provide a method and apparatus for normally operating an interfered BS by determining and avoiding the influence of interference of an uplink region caused by a downlink sub-frame of an interfering BS located at a distance of a Transmit/receive Transition Gap (TTG) interval or more in a mobile communication system, particularly in a Worldwide Interoperability for Microwave Access (WiMAX) Time Division Duplex (TDD) system.

A further aspect of the present disclosure is to provide a method and apparatus for avoiding the influence of interference by changing a frame configuration of an interfered BS, increasing a TTG, and increasing a range capable of isolating an uplink sub-frame of the interfered BS from a downlink sub-frame of an interfering BS in a mobile communication system.

The above aspects are achieved by providing a method and apparatus for avoiding downlink interference of an interfering BS in a mobile communication system.

According to one aspect of the present disclosure, a method for avoiding interference of an interfering BS in an interfered BS of a mobile communication system is provided. The method includes determining an interference value of an interfering BS at a control region during a determination interval. When the interference value is greater than a threshold value, the method includes operating in a modified TTG mode and, when the interference value is less than the threshold value, the method includes operating in a general TTG mode.

According to another aspect of the present disclosure, an apparatus of an interfered BS for avoiding interference of an interfering BS of a mobile communication system is provided. The apparatus includes a backhaul communication unit, a modulator/demodulator (modem), and a controller. The backhaul communication unit communicates with an upper node. The modem communicates with a terminal. The controller determines an interference value of an interfering BS at a control region during a determination interval. When the interference value is greater than a threshold value, the controller operates in a modified TTG mode and, when the interference value is less than the threshold value, the controller operates in a general TTG mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 6:
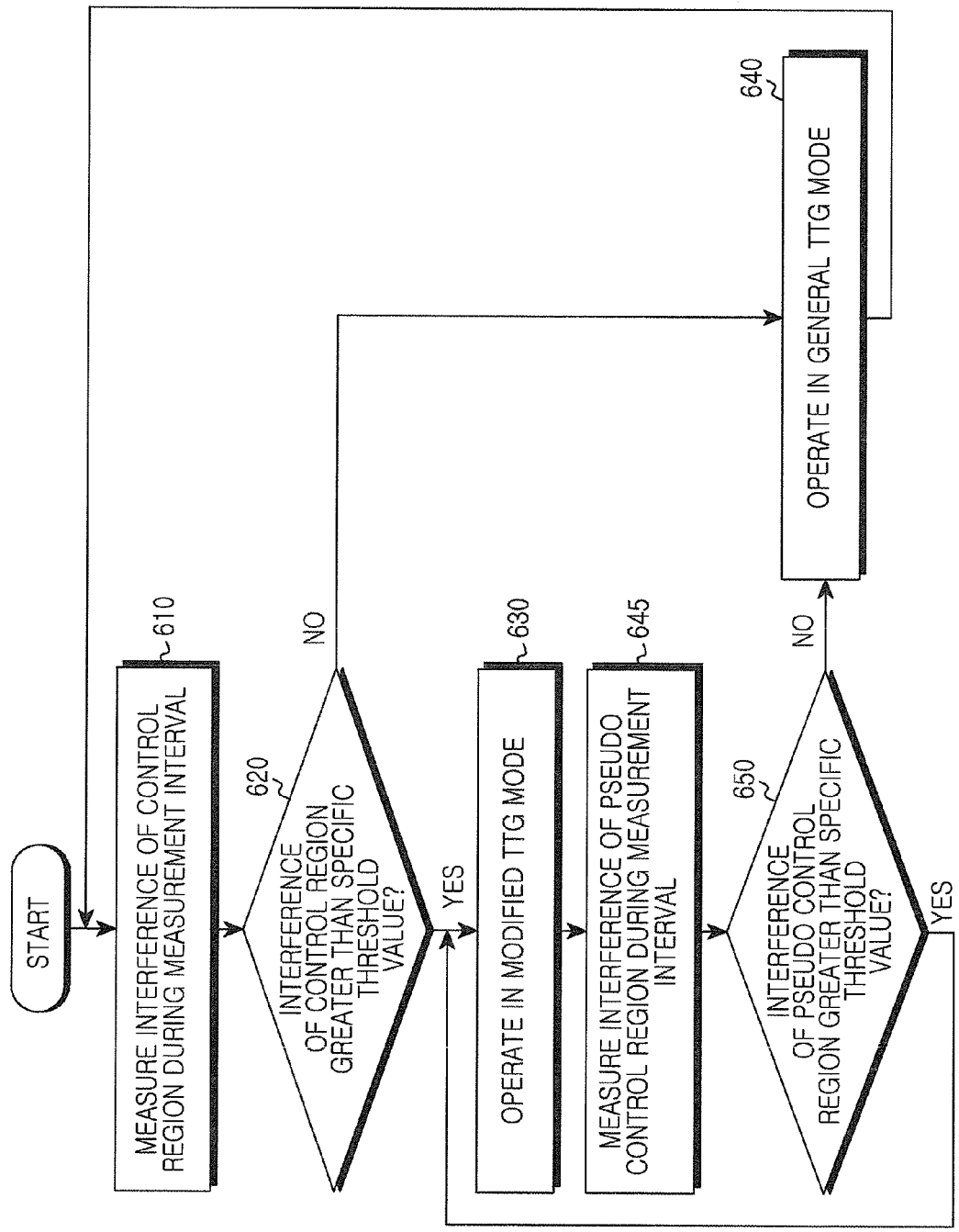
Figure 7:
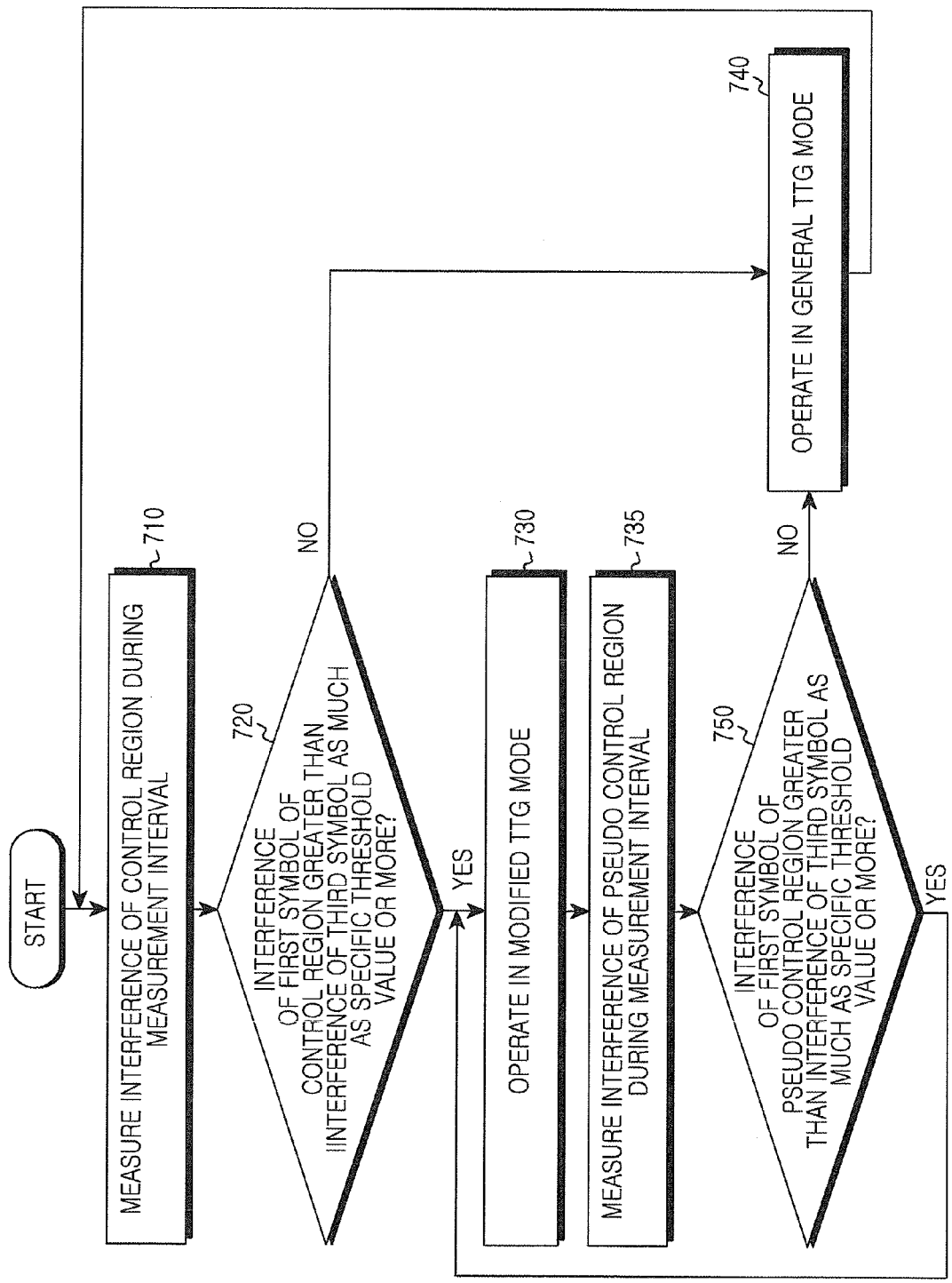
Figure 8:
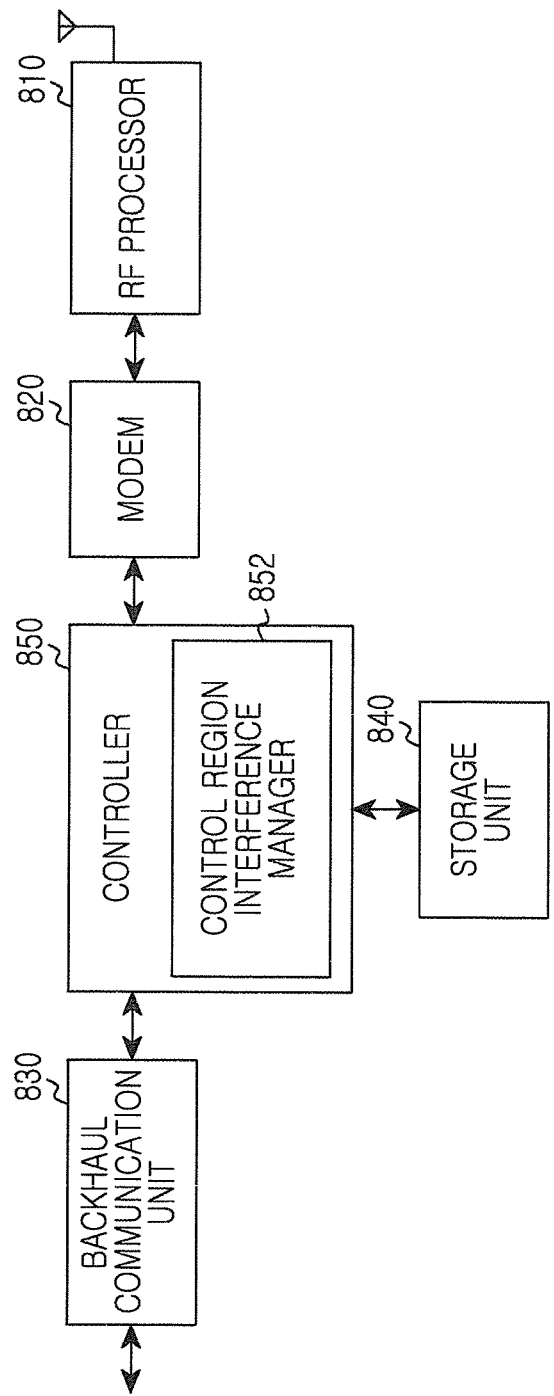

region or a pseudo control region according to an exemplary embodiment of the present disclosure;

FIG. 6 is a flowchart illustrating an interference avoidance process of an interfered BS according to an exemplary embodiment of the present disclosure;

FIG. 7 is a flowchart illustrating an interference avoidance process of an interfered BS according to another exemplary embodiment of the present disclosure;

FIG. 8 is a block diagram illustrating a construction of an interfered BS according to an exemplary embodiment of the present disclosure; and FIG. 9 is a diagram illustrating a change of the number of symbols for terminal operation in an invalid TTG mode and a valid TTG mode according to an exemplary embodiment of the present disclosure.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined on the basis of the disclosure throughout this specification.

The present disclosure relates to a method and apparatus for changing a frame configuration of an interfered Base Station (BS) and avoiding interference of a downlink frame of a long-distance interfering BS in a mobile communication system.

To separate downlink and uplink sub-frames, a Worldwide Interoperability for Microwave Access (WiMAX) communication system employs duplex methods of two types. The duplex methods include Time Division Duplex (TDD) and Frequency Division Duplex (FDD) schemes. The two duplex methods each have clear merits according to utilization uses. In the WiMAX forum, a fixed WiMAX profile has defined all of the FDD and the TDD, and a mobile WiMAX profile has defined only the TDD.

A TDD system neither requires a paired frequency channel for uplink and downlink nor requires a guard band. Instead, the TDD system separates the downlink and uplink in a time domain, but the downlink and uplink use the same frequency channel.

Each frequency channel is composed of one downlink sub-frame and one uplink sub-frame. The TDD system uses a guard interval between transition from downlink to uplink and from uplink to downlink. The guard interval is called a Transmit/receive Transition Gap (TTG) and a Receive/transmit Transition Gap (RTG). At the sector edge of a cell, generally, the TTG is set greater than the RTG so as to adapt a round-trip delay of a signal to regulations.

In general, the merits of the TDD system are given below.

Firstly, by setting duration of downlink and uplink sub-frames differently, the TDD system can simply set flexible downlink or uplink frequency allocation. Secondly, because downlink and uplink use the same frequency channel, there is a relation in which channel responses are reciprocal to each other. So, it is relatively easy to optimize transmission parameters in a BS used in a Multiple Input Multiple Output (MIMO) or Beamforming (BF) system. Thirdly, because downlink and uplink use the same oscillator and filter, there is an advantage in that hardware cost is cheaper than in an FDD system.

On the other hand, the demerits of the TDD system are given below.

Firstly, as a BS does not synchronize a frame with a neighboring BS, when there is a different uplink and downlink symmetry, interference can occur. A problem of inter-BS interference can be more serious than a problem of inter-BS-terminal interference because a Line-Of-Sight (LOS) environment may exist between BSs. Secondly, when there are one or more common carriers in a specific area, a cell of a different common carrier using an adjacent frequency channel can overlap, and Adjacent Channel Interference (ACI) can be brought about. This can be solved by physically widening a distance between BSs using adjacent frequency channels or placing a guard band in a frequency band used by a different common carrier. Thirdly, a TTG interval should be greater than a round-trip delay. To make coverage large, an overhead of a TTG can be significant in proportion to a TDD frame. For this reason, the efficiency of a system can be deteriorated.

In the WiMAX system, the TDD system should synchronize a frame with a neighboring BS and have uplink and downlink symmetry so as to reduce an interference problem. For this, the TDD system isolates a downlink sub-frame of a first BS from an uplink sub-frame of a second BS using a TTG interval so that the downlink sub-frame of the first BS does not have influence on the uplink sub-frame of the second BS.

FIGS. 1A, 1B and 1C are diagrams illustrating the influence of a downlink sub-frame of an interfering BS on an uplink sub-frame of an interfered BS according to an exemplary embodiment of the present disclosure.

In a WiMAX profile, a distance capable of isolating downlink and uplink sub-frames between BSs is 32 kilometers (km) on a basis of TTG=105.7 microseconds (μs) (as shown in FIG. 1A). That is, a downlink sub-frame of an interfering BS being 32 km distant from an interfered BS is received at a TTG interval (as shown in FIG. 1B). However, a downlink sub-frame received from an interfering BS being 32 km or more distant from an interfered BS can have influence on an uplink sub-frame of the interfered BS (as shown in FIG. 1C).

Figure 1:
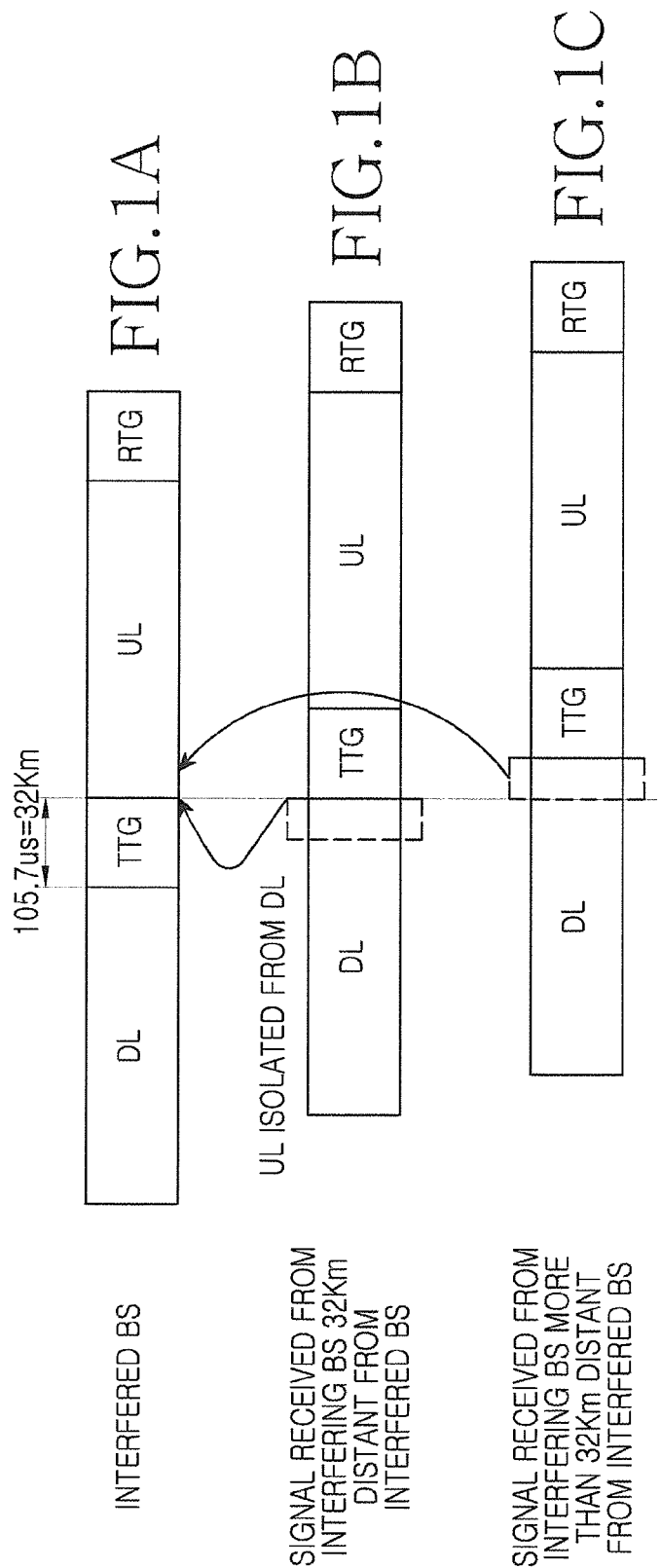
FIG. 1A is a diagram illustrating the influence of a downlink sub-frame of an interfering Base Station (BS) on an uplink sub-frame of an interfered BS according to an exemplary embodiment of the present disclosure.
FIG. 1B is a diagram illustrating the influence of a downlink sub-frame of an interfering Base Station (BS) on an uplink sub-frame of an interfered BS according to an exemplary embodiment of the present disclosure.
FIG. 1C is a diagram illustrating the influence of a downlink sub-frame of an interfering Base Station (BS) on an uplink sub-frame of an interfered BS according to an exemplary embodiment of the present disclosure.
Figure 2:
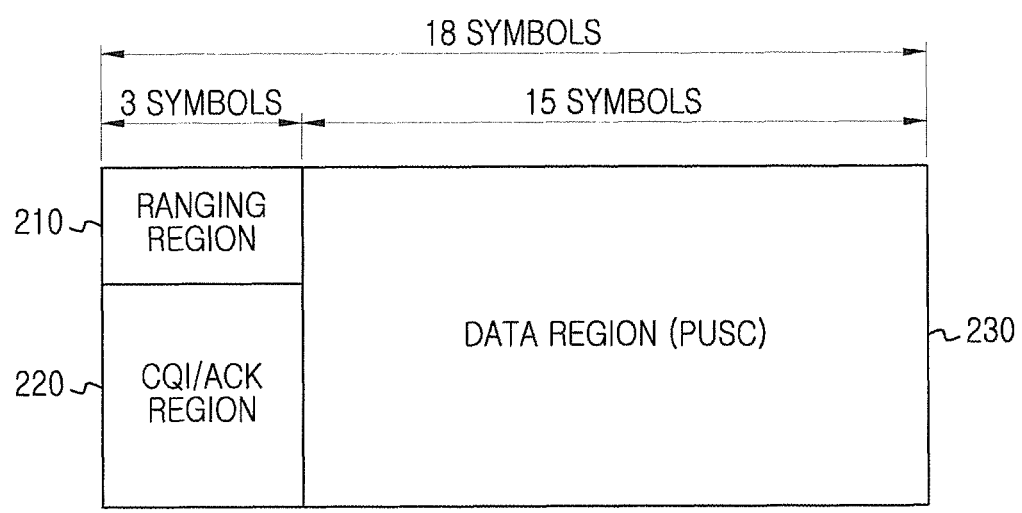
FIG. 2 is a diagram illustrating an uplink frame according to an exemplary embodiment of the present disclosure.

FIG. 2 is a diagram illustrating an uplink frame according to an exemplary embodiment of the present disclosure. Referring to FIG. 2, an uplink frame includes a ranging region 210, a Channel Quality Information/ACKnowledgement (CQUACK) region 220, and a data region 230.

A downlink sub-frame of an interfering BS can interfere in an uplink CQI/ACK region 220 of an interfered BS. That is, downlink interference can bring about CQI deletion, causing a problem in a channel quality report, and the downlink interference can bring about ACK deletion, thus causing a loss of feedback information. That is, the interfered BS can be in a state in which an uplink service is impossible because deletion occurs in the CQUACK region 220.

As one method for isolating an uplink sub-frame of an interfered BS from a downlink sub-frame of an interfering BS, antenna down tilt can be used. However, an area in which an omni-antenna is installed such as a rural area may have difficulty with hardware supplementation, personnel expenditures and the like for performing the antenna down tilt. In addition, it is relatively difficult to find an interference source in an area in which many BSs are installed.

To avoid interference of an interfering BS, one embodiment of the present disclosure uses a method of monitoring noise and interference at a CQUACK region 220, and if interference is greater than a specific threshold value, changing a current frame configuration of an interfered BS, increasing a TTG, and increasing a range capable of isolating an uplink sub-frame of the interfered BS from a downlink sub-frame of the interfering BS.

Figure 3:
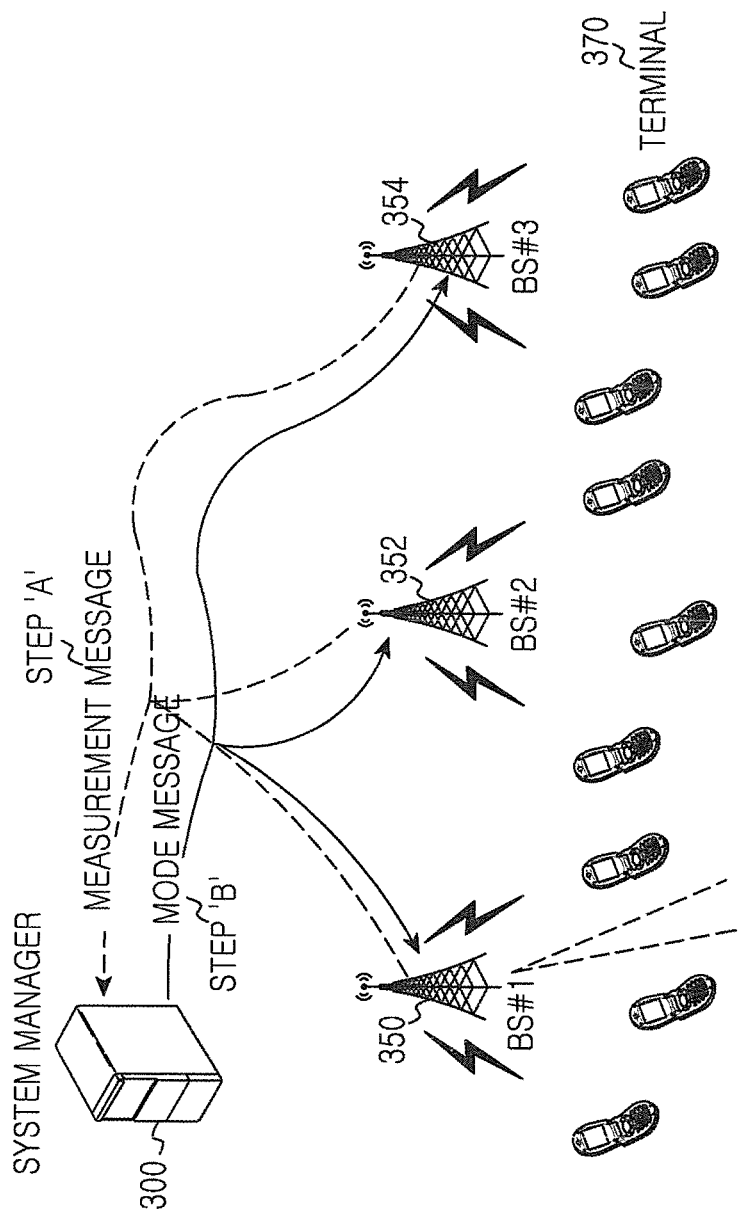
FIG. 3 is a diagram illustrating the extent of interference of a downlink sub-frame of an interfering BS and a Transmit/receive Transition Gap (TTG) control method according to an exemplary embodiment of the present disclosure.

FIG. 3 is a diagram illustrating the extent of interference of a downlink sub-frame of an interfering BS and a TTG control method according to an exemplary embodiment of the present disclosure. Referring to FIG. 3, a system manager 300 receives a determination message (step 'a') including the extent of interference of a neighboring interfering BS determined by a plurality of BSs 350, 352, and 354, decides a mode to be used (e.g., a TTG mode) based on the determination message using an algorithm to be described below, includes the decided mode in a mode message (step 'b'), and transmits the mode message to the plurality of BSs 350, 352, and 354.

The plurality of BSs 350, 352, and 354 manage terminals 370. In one embodiment of the present disclosure, the system manager 300 can decide the mode to be used or, for another embodiment, the plurality of BSs 350, 352, and 354 can decide the mode to be used.

If an interfered BS intends to turn off the last two symbols of a downlink sub-frame of an interfering BS and avoid interference of the interfering BS, a decrease of a downlink throughput results. To avoid this performance decrease, the interfered BS may operate basically at a 29:18 symbol rate, and monitor a CQUACK region to determine if the influence of interference of a downlink sub-frame of a long-distance interfering BS is large.

There are at least two methods in which an interfered BS may monitor a CQI/ACK region and determine if interference is large. The two methods can be used in combination or independently. The first method is that, if the extent of interference (i.e., noise and interference) that an interfered BS determines at the first three symbols of a CQI/ACK region is more than a threshold value, it is determined that the interference is large. The second method is that, when interference that an interfered BS determines at the first symbol of a CQI/ACK region is greater than interference determined at the third symbol by as much as a threshold value or more, it is determined that the interference is large.

In a case where it is determined that the interference is large, the interfered BS may increase a TTG from 32 km to 124 km by changing a frame configuration for a terminal into a 32:15 symbol rate using a MAP Information Element (IE) and instructing the terminal not to use the last three symbols of a downlink sub-frame of the interfered BS.

Through the above interference monitoring, the interfered BS can change a frame configuration to operate normally. Here, the threshold value can be changed according to the implemented embodiment, a common carrier's setting and/or the like.

Figure 4:
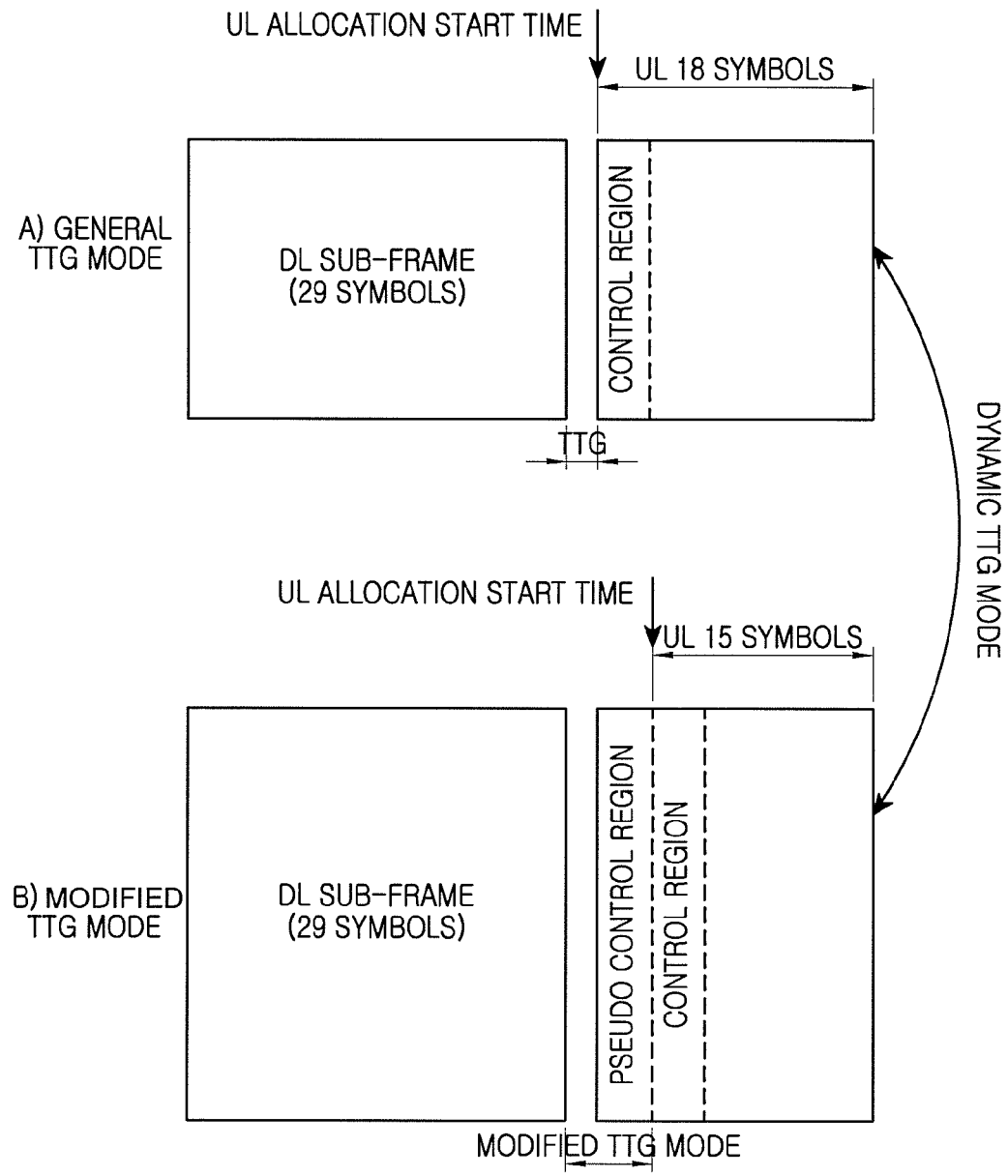
FIG. 4 is a diagram illustrating a frame structure dependent on TTG mode operation according to an exemplary embodiment of the present disclosure.

FIG. 4 is a diagram illustrating a frame structure dependent on TTG mode operation according to an exemplary embodiment of the present disclosure. Referring to FIG. 4, a dynamic transition between TTG modes is described. While an interfered BS monitors interference of an interfering BS, the interfered BS may increase a general TTG interval (step 'a') to a modified TTG interval (step 'b') according to the extent of the interference, avoiding interference of a downlink sub-frame of the interfering BS exerted at a distance of 32 km or more.

For one embodiment, the interfered BS senses if interference of the first three symbols of a CQI/ACK region determined during a determination interval is greater than a specific threshold value or if interference of the first symbol of a CQI/ACK region is greater than interference of the third symbol of the CQI/ACK region by as much as a specific threshold value or more. If the condition is met, the interfered BS converts a general TTG mode (step 'a') into the modified TTG mode (step 'b').

The interfered BS can use a dynamic method of, after converting into the modified TTG mode, determining interference of a pseudo control region and, when the determined interference value is less than the specific threshold value, again restoring the modified TTG mode to the general TTG mode. The pseudo control region represents a region that belongs to a control region in the general TTG mode and, in the modified TTG mode, belongs to a TTG, not the control region.

The modified TTG mode includes delaying a start position of an uplink sub-frame of the general TTG mode to some extent (e.g., three symbols in the present disclosure) and disabling use by a terminal of a predetermined number of last symbols (e.g., three symbols in the present disclosure) of a downlink sub-frame of an interfered BS.

Figure 5:
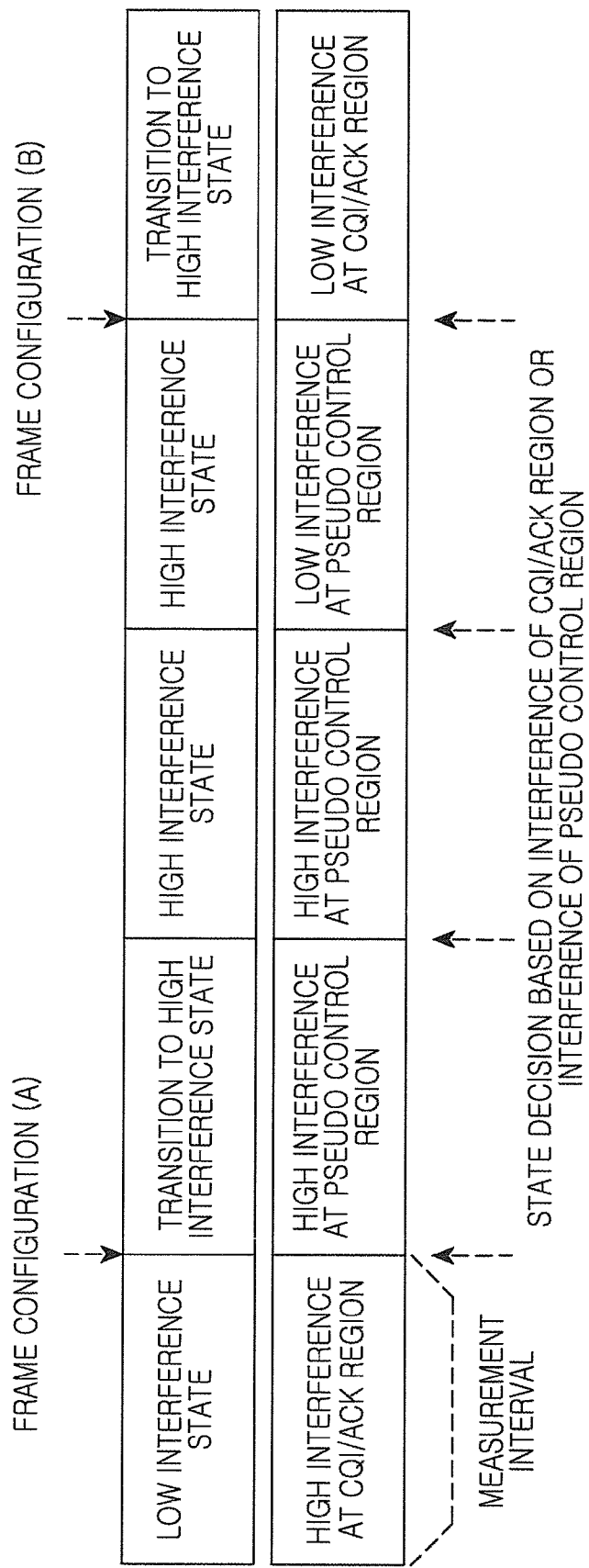
FIG. 5 is a diagram illustrating a process of TTG mode transition dependent on the extent of interference of a Channel Quality Information/ACKnowledgement (CQI/ACK)

FIG. 5 is a diagram illustrating a process of TTG mode transition dependent on the extent of interference of a CQI/ACK region or a pseudo control region according to an exemplary embodiment of the present disclosure. Referring to FIG. 5, when an interfered BS operates in a general TTG mode, the interfered BS may use a 29:18 symbol rate for a terminal and set an uplink allocation start time on a basis of 18 symbols in an uplink sub-frame.

At a determination interval, in a case where an interference value of the first three symbols of a CQI/ACK region is equal to or greater than a threshold value (i.e., in a case where the interference value indicates high interference), the interfered BS may change a frame configuration (step 'a') and operate in the modified TTG mode. Below, the CQI/ACK region is called a control region.

In this case, the interfered BS may use a 32:15 symbol rate for the terminal and construct a MAP so that the interfered BS does not use the last three symbols of a downlink sub-frame. In addition, the interfered BS may set an uplink allocation start time on a basis of 15 symbols in the uplink sub-frame.

After that, the interfered BS may determine interference of the first three symbols of a pseudo control region. In a case where the interference value is less than a threshold value (i.e., in a case where the interference value indicates low interference), the interfered BS may change a frame configuration (step 'b') and operate in the general TTG mode.

FIG. 6 is a flowchart illustrating an interference avoidance process of an interfered BS according to an exemplary embodiment of the present disclosure. Referring to FIG. 6, the interfered BS determines interference of an interfering BS at the first three symbols of a control region during a determination interval (step 610).

If the interference at the first three symbols of the control region is greater than a specific threshold value (step 620), the interfered BS operates in the modified mode (step 630). After that, the interfered BS determines interference of the interfering BS at the first three symbols of a pseudo control region during a determination interval (step 645).

Next, if the interference at the first three symbols of the pseudo control region is greater than a specific threshold value (step 650), the interfered BS continues to operate in the modified TTG mode (step 630). If the interference at the first three symbols of the pseudo control region is less than the specific threshold value (step 650), the interfered BS operates in a general TTG mode (step 640).

If the interference at the first three symbols of the control region is less than the specific threshold value (step 620), the interfered BS operates in the general TTG mode (step 640). After that, the interfered BS continues to determine interference of the interfering BS at the first three symbols of the control region during a determination interval (step 610).

In the aforementioned process, in a case where interference at a control region or a pseudo control region is greater than a specific threshold value, the interfered BS can transmit a determination message indicating that the interference is greater than the specific threshold value to the system manager 300 of FIG. 3. Then the system manager 300 can transmit a mode message to the interfered BS instructing the interfered BS to operate in the modified TTG mode.

Alternatively, in a case where interference at a control region or a pseudo control region is less than a specific threshold value, the interfered BS can transmit a determination message indicating that the interference is less than the specific threshold value to the system manager 300 of FIG. 3. Then the system manager 300 can transmit a mode message to the interfered BS instructing the interfered BS to operate in the general TTG mode.

FIG. 7 is a flowchart illustrating an interference avoidance process of an interfered BS according to another exemplary embodiment of the present disclosure. Referring to FIG. 7, the interfered BS determines interference of an interfering BS at a control region during a determination interval (step 710).

If interference at the first symbol of the control region is greater than interference at the third symbol of the control region by as much as a specific threshold value or more (step 720), the interfered BS operates in the modified TTG mode (step 730). After that, the interfered BS determines interference of the interfering BS at a pseudo control region during a determination interval (step 735).

Next, if interference at the first symbol of the pseudo control region is greater than interference at the third symbol of the pseudo control region by as much as a specific threshold value or more (step 750), the interfered BS continues to operate in the modified TTG mode (step 730). If the interference at the first symbol of the pseudo control region is not greater than interference at the third symbol by as much as the specific threshold value or more (step 750), the interfered BS operates in a general TTG mode (step 740).

If the interference at the first symbol of the control region is not greater than the interference at the third symbol by as much as the specific threshold value or more (step 720), the interfered BS operates in the general TTG mode (step 740). After that, the interfered BS continues to determine interference of the interfering BS at the control region during a determination interval (step 710).

In the aforementioned process, in a case where interference at the first symbol of a control region or a pseudo control region is greater than interference at the third symbol by as much as a specific threshold value or more, the interfered BS can transmit a determination message indicating that the interference is greater than the specific threshold value to the system manager 300 of FIG. 3. Then the system manager 300 can transmit a mode message to the interfered BS instructing the interfered BS to operate in the modified TTG mode.

Alternatively, in a case where interference at the first symbol of a control region or a pseudo control region is less than interference at the third symbol by as much as a specific threshold value or more, the interfered BS can transmit a determination message indicating that the interference is less than the specific threshold value to the system manager 300 of FIG. 3. Then the system manager 300 can transmit a mode message to the interfered BS instructing the interfered BS to operate in the general TTG mode.

FIG. 8 is a block diagram illustrating a construction of an interfered BS according to an exemplary embodiment of the present disclosure. For the embodiment illustrated in FIG. 8, the interfered BS includes a Radio Frequency (RF) processor 810, a modulator/demodulator (modem) 820, a backhaul communication unit 830, a storage unit 840, and a controller 850.

The RF processor 810 performs a function for transmitting/receiving a signal through a wireless channel, such as signal band conversion, amplification and the like. That is, the RF processor 810 up converts a baseband signal provided from the modem 820 into an RF band signal and then transmits the RF band signal through an antenna. The RF processor 810 also down converts an RF band signal received through the antenna into a baseband signal.

The modem 820 performs a function of conversion between a baseband signal and a bit stream according to the physical layer standard of a system. For example, at data transmission, the modem 820 creates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. Also, at data reception, the modem 820 divides a baseband signal provided from the RF processor 810 in the form of OFDM symbols, restores signals mapped to subcarriers through Fast Fourier Transform (FFT) operation, and then restores a reception bit stream through demodulation and decoding.

The backhaul communication unit 830 provides an interface for performing communication with an upper node. That is, the backhaul communication unit 830 converts a bit stream transmitted from the BS to an upper node into a physical signal. The backhaul communication unit 830 also converts a physical signal received from the upper node into a bit stream.

The storage unit 840 stores data of a basic program for an operation of the BS, an application program, user contents and/or the like. Also, the storage unit 840 provides the stored data according to a request of the controller 850.

The controller 850 controls general operations of the interfered BS. For example, the controller 850 constructs and provides downlink data to the modem 820 and interprets uplink data provided from the modem 820. Also, the controller 850 includes a control region interference manager 852.

In a first exemplary embodiment of the present disclosure, the control region interference manager 852 operates as follows.

The control region interference manager 852 determines interference of the interfering BS at a control region during a determination interval. In a case where the interference at the control region, specifically, at the first three symbols of the control region, is greater than a specific threshold value, the control region interference manager 852 operates in the modified TTG mode.

After that, the control region interference manager 852 determines interference of the interfering BS at a pseudo control region during a determination interval. In a case where the interference at the pseudo control region, specifically, the interference at the first three symbols of the pseudo control region, is greater than a specific threshold value, the control region interference manager 852 continues to operate in the modified TTG mode. In a case where the interference at the pseudo control region, specifically, the interference at the first three symbols of the pseudo control region, is less than the specific threshold value, the control region interference manager 852 operates in a general TTG mode.

In a case where the interference at the control region, specifically, the interference at the first three symbols of the control region, is less than the specific threshold value, the control region interference manager 852 operates in the general TTG mode. After that, the control region interference manager 852 continues to determine interference of the interfering BS at the control region, specifically, the first three symbols, during a determination interval.

In a case where interference at a control region (specifically, the first three symbols) or a pseudo control region (specifically, the first three symbols) is greater than a specific threshold value, the control region interference manager 852 can transmit a determination message indicating that the interference is greater than the specific threshold value to the system manager 300 of FIG. 3. Then the system manager 300 can transmit a mode message to the interfered BS instructing the interfered BS to operate in the modified mode.

Alternatively, in a case where interference at a control region (specifically, the first three symbols) or a pseudo control region (specifically, the first three symbols) is less than a specific threshold value, the control region interference manager 852 can transmit a determination message indicating that the interference is less than the specific threshold value to the system manager 300 of FIG. 3. Then the system manager 300 can transmit a mode message to the interfered BS instructing the interfered BS to operate in a general TTG mode.

In a second exemplary embodiment of the present disclosure, the control region interference manager 852 operates as follows.

The control region interference manager 852 determines interference of an interfering BS at a control region during a determination interval. After that, if interference at the first symbol of the control region is greater than interference at the third symbol of the control region by as much as a specific threshold value or more, the control region interference manager 852 operates in the modified TTG mode. After that, the control region interference manager 852 determines interference of the interfering BS at a pseudo control region during a determination interval.

Next, if interference at the first symbol of the pseudo control region is greater than interference at the third symbol of the pseudo control region by as much as a specific threshold value or more, the control region interference manager 852 continues to operate in the modified TTG mode. If the interference at the first symbol of the pseudo control region is not greater than interference at the third symbol by as much as the specific threshold value or more, the control region interference manager 852 operates in a general TTG mode.

In a case where the interference at the first symbol of the control region is not greater than the interference at the third symbol by as much as the specific threshold value or more, the control region interference manager 852 operates in the general TTG mode. After that, the control region interference manager 852 continues to determine interference of the interfering BS at the control region during a determination interval.

In a case where interference at the first symbol of a control region or a pseudo control region is greater than interference at the third symbol by as much as a specific threshold value or more, the control region interference manager 852 can transmit a determination message indicating that the interference is greater than the specific threshold value to the system manager 300 of FIG. 3. Then the system manager 300 can transmit a mode message to the interfered BS instructing the interfered BS to operate in the modified TTG mode.

Alternatively, in a case where interference at the first symbol of a control region or a pseudo control region is less than interference at the third symbol by as much as a specific threshold value or more, the control region interference manager 852 can transmit a determination message indicating that the interference is less than the specific threshold value to the system manager 300 of FIG. 3. Then the system manager 300 can transmit a mode message to the interfered BS instructing the interfered BS to operate in a general TTG mode.

An operation of a terminal that supports the present disclosure in accordance with one embodiment is described below. To inform the terminal if a current TTG mode is a modified TTG mode or a general TTG mode, a BS uses a number of downlink/uplink symbols.

For example, in a case where a BS operates in a general TTG mode with the number of downlink/uplink symbols of 29:18, in order to operate in a modified TTG mode with the number of downlink/uplink symbols of 32:15, the BS can transmit the number of downlink/uplink symbols of 32:15 to the terminal.

FIG. 9 is a diagram illustrating a change in the number of symbols for terminal operation in a modified TTG mode and a general TTG mode according to an exemplary embodiment of the present disclosure. Referring to FIG. 9, in a case of general TTG operation, there is not a change in the number of downlink/uplink symbols of a terminal. However, in a case of modified TTG operation, the terminal uses the number of downlink/uplink symbols of 29:18 and 32:15 in combination.

Accordingly, in a case where there is a change in the number of downlink/uplink symbols indicated in a downlink/uplink MAP IE, in order to support a seamless service without call cutoff, the terminal supports the following. In standards, a DownLink (DL) MAP includes allocation information on a current frame and an UpLink (UL) MAP includes allocation information on a next frame.

Accordingly, when the number of downlink/uplink symbols changes from 29:18 to 32:15, information transmitted through the UL MAP changes as shown in FIG. 9. Therefore, even the terminal should be able to support such an operation. In FIG. 9, '(c)' denotes the allocation information on the current frame, and '(n)' denotes the allocation information on the next frame. When the number of downlink/uplink symbols changes from 32:15 to 29:18, information transmitted through the UL MAP changes as shown in FIG. 9. Therefore, even the terminal should be able to support such an operation.

In detail, in a case where the terminal receives the UL MAP indicating that the number of downlink/uplink symbols changes from 29:18 to 32:15, the terminal recognizes that the number of downlink/uplink symbols of a subsequent frame is changed to 29:18, 29:15, and 32:15. At downlink frame reception and uplink frame reception, the terminal performs reception and transmission operation according to the defined number of symbols.

In a case where the terminal receives the UL MAP indicating that the number of downlink/uplink symbols changes from 32:15 to 29:18, the terminal recognizes that the number of downlink/uplink symbols of a subsequent frame is changed to 32:15, 32:18, and 29:18. At downlink frame reception and uplink frame reception, the terminal performs reception and transmission operation according to the defined number of symbols.

A hardware construction of the terminal can use the remnant construction excepting the backhaul communication unit 830 in FIG. 8. That is, it can be said that the terminal has the same basic functions as the controller 850, the storage unit 840, the modem 820, and the RF processor 810 of the BS. However, a controller of the terminal can process the aforementioned function of FIG. 8.

As described above, the present disclosure can avoid interference by monitoring interference of an interfering BS while changing a frame configuration of an interfered BS according to the extent of the interference, increasing a TTG, and increasing a range capable of protecting an uplink sub-frame of a terminal from a downlink sub-frame of the interfering BS.

Also, the present disclosure is applicable to a BS whose interference avoidance is not solved by parameter optimization and can recover a downlink throughput of an interfered BS to a normal state.

Also, the present disclosure avoids downlink interference of a long-distance interfering BS and makes better a reception ratio for a CQI/ACK region, thereby improving performance.

Also, the present disclosure has an advantage of being able to improve performance through software modifications, without requiring additional hardware.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for avoiding interference of a Base Station (BS) in a mobile communication system, the method comprising:
    determining, in a general Transmit/receive Transition Gap (TTG) mode, an interference from at least one other of a BS at a first region;
    when the interference is greater than a threshold, switching to a modified TTG mode; and
    determining, in the modified TTG, an interference at a second region to determine whether to switch to the general TTG mode,
    wherein a TTG of the modified TTG mode is larger than a TTG of the general TTG mode.

2. The method of claim 1, further comprising:
    when the interference at the second region is greater than the threshold, continuing to operate in the modified TTG mode; and
    when the interference at the second region is less than the threshold, switching to the general TTG mode.

3. The method of claim 1, further comprising;
    increasing a TTG by delaying a start position of an uplink sub-frame of the BS by a predetermined number of symbols and disabling use by a terminal belonging to the BS of the predetermined number of last symbols of a downlink sub-frame of the BS.

4. The method of claim 1, wherein the first region is a Channel Quality Information/ACKnowledgement (CQI/ACK) region.

5. The method of claim 1, wherein the interference is greater than the threshold when an interference for a predetermined number of first symbols of the first region is greater than the threshold, and
    wherein the interference is less than the threshold when the interference for the predetermined number of first symbols of the first region is less than the threshold.

6. The method of claim 1, wherein the interference is greater than the threshold when an interference determined at a first symbol of the first region is greater than an interference determined at a third symbol of the first region by as much as the threshold or more, and
    wherein the interference is less than the threshold when the interference determined at the first symbol of the first region is not greater than the interference determined at the third symbol of the first region by as much as the threshold or more.

7. The method of claim 2, wherein the interference at the second region is greater than the threshold when an interference for a predetermined number of first symbols of the second region is greater than the threshold, and
    wherein the interference at the second region is less than the threshold when the interference for the predetermined number of first symbols of the second region is less than the threshold.

8. The method of claim 2, wherein the interference at the second region is greater than the threshold when an interference determined at a first symbol of the second region is greater than an interference determined at a third symbol of the second region by as much as the threshold or more, and
    wherein the interference at the second region is less than the threshold when the interference determined at the first symbol of the second region is not greater than the interference determined at the third symbol of the second region by as much as the threshold or more.

9. The method of claim 2, further comprising, when the interference at the first region is greater than the threshold or when the interference at the second region is greater than the threshold:
    transmitting a message indicating that the interference is greater than the threshold to an upper node;
    receiving a message instructing the interfered BS to operate in the modified TTG mode from the upper node; and
    operating in the modified TTG mode.

10. The method of claim 9, further comprising, when the interference value at the first region is less than the threshold or when the interference at the second region is less than the threshold:
    transmitting a message indicating that the interference is less than the threshold to the upper node;
    receiving a message instructing the interfered BS to operate in the general TTG mode from the upper node; and
    operating in the general TTG mode.

11. An apparatus of a Base Station (BS) for avoiding interference of a BS of a mobile communication system, the apparatus comprising:
    a backhaul communication unit configured to communicate with an upper node;
    a modulator/demodulator (modem) configured to communicate with a terminal; and
    a controller configured to determine, in a general Transmit/receive Transition Gap (TTG) mode, an interference from at least one other BS at a first region, and switch to a modified TTG mode when the interference is greater than a threshold, and determine, in the modified TTG mode, an interference at a second region to determine whether to switch to the general TTG mode, wherein a TTG of the modified TTG mode is larger than a TTG of the general TTG mode.

12. The apparatus of claim 11, wherein the controller is further configured to determine an interference of the BS at a second region, continue to operate in the modified TTG mode when the interference at the second region is greater than the threshold, and switch to the general TTG mode when the interference at the second region is less than the threshold.

13. The apparatus of claim 11, wherein the controller is further configured to operate in the modified TTG mode by increasing a TTG by delaying a start position of an uplink sub-frame of an interfered BS by a predetermined number of symbols, and disabling use by a terminal belonging to the interfered BS of the predetermined number of last symbols of a downlink sub-frame of the BS.

14. The apparatus of claim 11, wherein the first region is a Channel Quality Information/ACKnowledgement (CQI/ACK) region.

15. The apparatus of claim 11, wherein the interference is greater than the threshold when an interference for a predetermined number of first symbols of the first region is greater than the threshold, and
wherein the interference is less than the threshold when the interference for the predetermined number of first symbols of the first region is less than the threshold.

16. The apparatus of claim 11, wherein the interference is greater than the threshold when the interference determined at a first symbol of the first region is greater than an interference determined at a third symbol of the first region by as much as the threshold or more, and
the interference is less than the threshold when the interference determined at the first symbol of the first region is not greater than the interference determined at the third symbol of the first region by as much as the threshold or more.

17. The apparatus of claim 12, wherein the interference at the second region is greater than the threshold value when an interference for a predetermined number of first symbols of the second region is greater than the threshold, and
the interference at the second region is less than the threshold value when the interference for the predetermined number of first symbols of the second region is less than the threshold.

18. The apparatus of claim 12, wherein the interference at the second region is greater than the threshold when an interference determined at a first symbol of the second region is greater than an interference determined at a third symbol of the second region by as much as the threshold or more, and
wherein the interference at the second region is less than the threshold when the interference determined at the first symbol of the second region is not greater than the interference determined at the third symbol of the second region by as much as the threshold or more.

19. The apparatus of claim 12, wherein, when the interference value at the first region is greater than the threshold or when the interference at the second region is greater than the threshold, the controller is further configured to transmit a message indicating that the interference is greater than the threshold to an upper node, receive a message instructing the interfered BS to operate in the modified TTG mode from the upper node, and operate in the modified TTG mode.

20. The apparatus of claim 19, wherein, when the interference at the first region is less than the threshold or when the interference at the second region is less than the threshold, the controller is further configured to transmit a message indicating that the interference is less than the threshold to the upper node, receive a message instructing the interfered BS to operate in the general TTG mode from the upper node, and operate in the general TTG mode.

21. A method for operating a terminal in a mobile communication system, the method comprising:
receiving information indicating a modified Transmit/receive Transition Gap (TTG) mode when a Base Station (BS) determines that an interference at a first region is greater than a threshold in a general TTG mode;
switching to the modified TTG mode;
receiving information indicating the general TTG mode when the BS determines that an interference is less than the threshold; and
switching to the general TTG mode,
wherein a TTG of the modified TTG mode is larger than a TTG of the general TTG mode.

22. The method of claim 21, further comprising;
increasing a TTG by delaying a start position of an uplink sub-frame of the BS by a predetermined number of symbols, and disabling use by the terminal of the predetermined number of last symbols of a downlink sub-frame of the BS.

23. The method of claim 21, wherein the received information comprises an UpLink (UL) MAP.

24. An apparatus of a terminal in a mobile communication system, the apparatus comprising:
a modulator/demodulator (modem) configured to communicate with a Base Station (BS); and
a controller configured to:
receive information indicating a modified Transmit/receive Transition Gap (TTG) mode when the BS determines that an interference at a first region is greater than a threshold in a general TTG mode from the BS through the modem,
switch to the modified TTG mode,
receive information indicating the general TTG mode when the BS determines that an interference is less than the threshold; and
switch to the general TTG mode,
wherein a TTG of the modified TTG mode is larger than a TTG of the general TTG mode.

25. The apparatus of claim 24, wherein the controller is further configured to operate in the modified TTG mode by increasing a TTG by delaying a start position of an uplink sub-frame of a BS by a predetermined number of symbols, and disabling use by the terminal of the predetermined number of last symbols of a downlink sub-frame of the BS.

26. The apparatus of claim 24, wherein the received information comprises an UpLink (UL) MAP.

* * * * *